United States Patent [19]
Brown

[11] Patent Number: 5,063,033
[45] Date of Patent: Nov. 5, 1991

[54] PROCESS FOR THE PRODUCTION OF BOEHMITE

[75] Inventor: Neil Brown, Bonn, Fed. Rep. of Germany

[73] Assignee: Vereinigte Aluminum-Werke Aktiengesellschaft, Bonn, Fed. Rep. of Germany

[21] Appl. No.: 13,009

[22] Filed: Feb. 10, 1987

[51] Int. Cl.$^5$ .............. C01F 7/02; C01F 7/22
[52] U.S. Cl. .................. 423/112; 423/122; 423/131; 423/625; 423/628
[58] Field of Search ............ 423/112, 122, 131, 625, 423/628

[56] References Cited

U.S. PATENT DOCUMENTS

| | | | |
|---|---|---|---|
| 3,954,957 | 5/1976 | Koenig | 106/309 |
| 4,066,740 | 1/1978 | Erickson | 423/628 |
| 4,102,978 | 7/1978 | Kiovsky | 423/628 |
| 4,117,105 | 9/1978 | Hertzenberg et al. | 423/625 |
| 4,279,779 | 7/1981 | Sanchez et al. | 423/628 |
| 4,595,581 | 6/1986 | Misra et al. | 423/625 |
| 4,629,618 | 12/1986 | Oguri et al. | 423/625 |

FOREIGN PATENT DOCUMENTS 1381282  7/1963  France .................. 423/625

OTHER PUBLICATIONS

"The Thermal Decomposition of the Alumina Trihydrate, Gibbsite", by J. F. Brown et al., 1953.
"Thermal Transformations of Aluminas and Alumina Hydrates", by H. C. Stumpf, 1950.

Primary Examiner—R. Dean
Assistant Examiner—Margery S. Phipps
Attorney, Agent, or Firm—Darby & Darby

[57] ABSTRACT

The present invention provides a process for the production of crystalline boehmite of fine particle size and enhanced specific surface area. Coarse gibbsite particles, obtained from the Bayer Process, are lightly calcined and the non-boehmite-containing material is removed by dissolution in caustic aluminate liquors of appropriate composition.

10 Claims, 2 Drawing Sheets

PROCESS FOR THE PRODUCTION OF BOEHMITE

FIELD OF THE INVENTION

This invention relates to a process for the production of filler grade pigment of alumina monohydrate (boehmite, $Al_2O_3 \cdot H_2O$) characterized by fine particle size and enhanced specific surface area.

BACKGROUND OF THE INVENTION

Particulate boehmite is used in the glass, catalyst and ceramic industries. Commercially, boehmite particles are prepared by digestion of aluminium trihydroxide (gibbsite, chemical formula: $Al_2O_3 \cdot 3H_2O$) in water at temperatures of 200°-250° C. For example, U.S. Pat. No. 3,954,957 to Koenig describes a process for the production of boehmite pigment starting from gibbsite. The process involves preliminary grinding of gibbsite to an average particle size of 1-3 microns, and digesting the ground gibbsite in the presence of a controlled amount of mineral acid at temperatures between about 180°-250° C. for 0.5-120 minutes. This leads to the production of a boehmite product of uniform particle size having a particle size range of between about 0.2-0.7 microns.

It is also known that when crystallized gibbsite, obtained from the well-known Bayer Process for producing alumina from bauxite, is heated to a temperature in the range of 120° C. to 300° C., conversion of the gibbsite to measurable amounts of boehmite occurs, particularly if the heating is rapid and coarse gibbsite particles are used. (See, for example, Oxides and Hydroxides of Aluminum Technical Paper No. 19, Alcoa Research Laboratories, 1972.) This is known as the solid state reaction since it takes place in the absence of added water. The boehmite produced by solid state reaction is embedded in a matrix of activated material. In the discussions that follow below, the term "activated" refers to the non-boehmite components of the heated gibbsite material.

It therefore is an object of the present invention to provide a method for the production of crystalline boehmite of fine particle size.

It is a further object of the present invention to provide a method for the production of boehmite with a surface area which is substantially higher than that to be expected from particles of the order of about one micron in size.

A further object of the invention is to provide a new particulate boehmite material.

SUMMARY OF THE INVENTION

The present invention involves a process for the production of boehmite and a new boehmite material.

The boehmite production process comprises the steps of: calcining gibbsite particles to produce boehmite embedded in an activated matrix, separating the boehmite from the activated matrix material and recovering the boehmite product. Surprisingly, it has been found that under the conditions of the present invention, the boehmite formed by the solid state reaction process is not only crystalline and of a fine particle size, but has a specific surface area which is considerably higher (i.e. 4-5 fold) than that which would be expected for crystalline boehmite particles of the order of one micron in size. In order to translate this basic technical discovery into a commercially viable process for the production of crystalline boehmite, it has also been found that the activated matrix material can be removed to such an extent by dissolution in caustic aluminate liquor that the entire process can be comfortably incorporated as a side stream of the Bayer Process. It has also been found that by raising the initial heating temperature of the starting gibbsite to a temperature above 300° C. and heating only long enough to lower the loss-on-ignition (L.O.I.) to less than 20%, preferably 11-12%, from the initial gibbsite L.O.I. of approximately 35%, not only is the amount of boehmite maintained at a maximum value, but the activated matrix material has an unexpectedly high solubility in Bayer spent liquor under conditions of atmospheric temperature and pressure (see e.g. FIG. 1).

Accordingly, the process for the production of crystalline boehmite disclosed herein starts with coarse gibbsite particles of the Bayer Process, subjects the coarse particles to light calcination, removes the activated (non-boehmite) material by dissolution in Bayer spent liquor and produces fine crystalline boehmite of enhanced specific surface area, while simultaneously returning a high alumina containing pregnant liquor to the hydrate precipitation circuit of the Bayer Process.

BRIEF DESCRIPTION OF THE DRAWINGS

FIG. 3 shows electron micrographs of the starting material gibbsite (a) (1,000X magnification) and the resultant product boehmite (b) (5,000X magnification).

FIG. 4 shows electron micrographs of the resultant boehmite product (30,000X (a) and 50,000X magnification (b)).

DETAILED DESCRIPTION OF THE INVENTION

The process for the production of crystalline boehmite in accordance with the present invention, starts with the coarse gibbsite particles of the Bayer process, and subjects them to light calcination (i.e., heating to a high temperature but below the melting or fusing point, causing a partial loss of moisture). Unexpectedly, it has been found that the activated matrix material dissolves readily in caustic aluminate liquors, such as those produced by the well-known Bayer process, following the calcination step. This allows the process to be incorporated as a side stream of the main Bayer process. In addition, this process leads to the production of a fine crystalline boehmite of enhanced surface area.

The gibbsite (aluminium trihydroxide) from the Bayer Process, consisting for example, of gibbsite particles (90% greater than 45 $\mu$m in size) is lightly calcinated typically in a rotary oven at temperatures of greater than about 300° C., but optimally 350° C. (for rotary oven calcination) for a period long enough to lower the loss on ignition (L.O.I.) of the 'activated' gibbsite to less than 20%, but optimally 11%-12%. The higher the temperature, the shorter the retention time required. Under these conditions, the lightly calcined material contains about 30% of crystalline boehmite, as identified by X-ray diffraction, embedded in a matrix of which approximately half is chi-alumina (a thermodynamically unstable transition form of alumina containing appreciable amounts of hydroxide ions) with the remainder being material of such small particle size as to render it non-identifiable by X-ray diffraction. The activated matrix material contains little or no gibbsite, alpha-$Al_2O_3$ or gamma-$Al_2O_3$, none of which have the enhanced solubility in caustic aluminate liquors characteristic of the activated matrix material of the present invention.

Following the calcination step of the process, the boehmite-containing activated material is mixed with Bayer spent liquor, typically in a batch reactor equipped with means for mechanical agitation of the reactor contents under conditions of atmospheric pressure. Typically, a temperature of 85° C. is employed.

Figure 2:
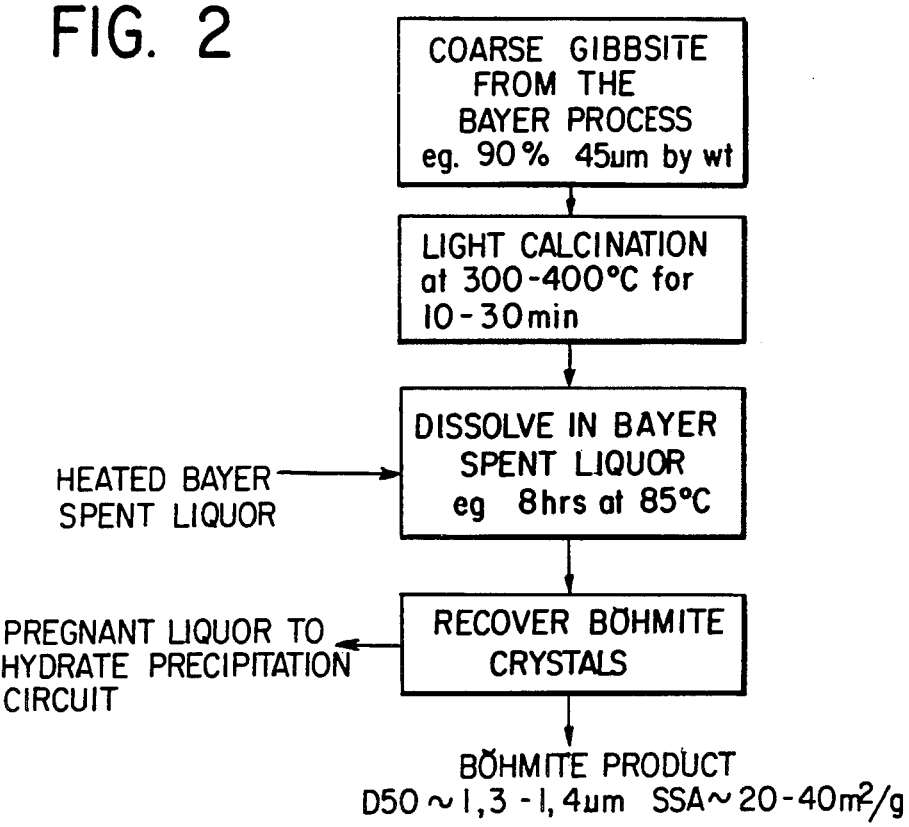
FIG. 2 is a flow sheet of the steps for preparing boehmite particles according to the present invention.

The dissolution step is continued until all of the activated matrix material is dissolved and all of the boehmite particles are released into suspension. Typically, this would be about eight hours at a temperature of 85° C., although less time would be required at higher temperatures. Following the dissolution, the boehmite-containing slurry is filtered, typically with a vacuum filter, and the crystalline boehmite product washed and dried. A flow sheet of this process is shown in FIG. 2, with typical operating data.

In an alternative embodiment of the present invention, the dissolution step may be carried out using a synthetic Bayer Process (caustic aluminate) liquor of appropriate composition or a Bayer Process liquor which has been oxidized or bleached to remove colored organics in order to obtain a whiter and brighter boehmite product.

A synthetic Bayer liquor (e.g. made up to contain 140 g/l $Na_2O$, 60 g/l alumina) will be free of the organic contaminants normally present in Bayer liquors. However, it is possible to use mixtures of synthetic and spent Bayer liquor in the process of the present invention.

The liquor used for the dissolution step, whether Bayer spent liquor, synthetic liquor or mixtures thereof, must initially contain at least an amount of alumina equal to that corresponding to the thermodynamic equilibrium solubility with respect to boehmite at the experimental temperatures used. For example, at a liquor caustic concentration of 140 g/l (expressed as $Na_2O$ free concentration) and a temperature of 85° C., the alumina concentration of the starting liquor must be at least approximately 60 g/l. Under these conditions, boehmite does not dissolve and remains precipitated out of solution; only the activated matrix material dissolves. Furthermore, at the relatively low temperature at which the dissolution step is carried out, it is not possible for the fine particle X-ray amorphous material to rehydrate to form boehmite. Higher alumina concentrations of the order of 150–155 g/l (at a $Na_2O$ free concentration of 140 g/l ) can be obtained by simply raising the dissolution temperature to 95°–100° C. and increasing the charge of 'activated' gibbsite.

The liquor obtained after separation of the boehmite product crystals contains a relatively high concentration of alumina and consequently can be routed directly back to the front end of the Bayer hydrate precipitation circuit. In producing a product which assays as 100% boehmite (by X-ray diffraction) there are some potential difficulties which must be avoided.

The dissolution period must be long enough to remove all of the activated matrix material, but not so long as to risk nucleating gibbsite at the high alumina concentrations that can be achieved. This would cause precipitation of the gibbsite and contamination of the boehmite. To avoid this problem, small amounts of liquor stabilizing agents such as calcium ions, added as calcium carbonate ($CaCO_3$) in amounts of 30–50 mg/l, may be added to the liquor.

The particle size and other physical properties of the boehmite products obtained in three separate runs are shown in Table 1 below.

TABLE 1

| | Properties of the Boehmite Produced | | | |
|---|---|---|---|---|
| Run No. | L.O.I.** (%) | Specific Surface Area ($m^2$/g) | $D_{50}$* ($\mu$m) | Total $Na_2O$ (%) |
| 1 | 17.4 | 38 | 1.4 | 0.27 |
| 2 | 16.0 | 27 | 1.3 | 0.33 |
| 3 | 16.2 | 22 | 1.4 | 0.49 |

*Mean diameter, by Coulter Counter, 30 $\mu$m orifice tube.
**Loss-on Ignition at 1200° C. of boehmite product.

The yield of boehmite obtained in each of the three runs shown in Table 3 was 100% of that predicted from the initial X-ray diffraction analyses of the lightly-calcined gibbsite, when due allowance is made for the presence of impurities and the amount of water in excess of the theoretical 15% maximum.

The specific surface areas presented in Table 1 are significantly higher than those expected for crystalline boehmite of similar particle size, i.e. 4–6$m^2$/g.

FIG. 3(a) shows a scanning electron micrograph of a typical starting gibbsite particle. The product boehmite obtained therefrom in accordance with the practice of the present invention is shown in FIG. 3(b). FIG. 4 shows electron micrographs at higher magnifications, revealing the basis for the higher than expected specific surface area of the boehmite product crystals. The boehmite crystals surfaces are irregular and pitted, presumably relics of the water release mechanism of the initial calcination of gibbsite.

The properties of the activated gibbsite under various calcination conditions are presented below in Table 2 and graphically in FIG. 1.

TABLE 2

| | Properties of the 'Activated' Gibbsite | | | | | | | | | |
|---|---|---|---|---|---|---|---|---|---|---|
| | Calcination Conditions | | Product Properties | | | | | | | |
| Expt. No. | End Temp. (°C.) | Time to Temp. (mins) | L.O.I. (%) | Boehmite Content (%) | Specific Surface ($m^2$/g) | Alumina Dissolved in Spent Liquor (g/l) after the following times at 85° C. * | | | | |
| | | | | | | 1 | 2 | 3 | 5 | 8 (Hrs.) |
| 1 | 256 | 30 | 28.9 | 26 | 13.2 | 111.5 | 111.6 | 111.3 | 111.1 | — |
| 2 | 282 | 30 | 23.1 | 27 | 126.3 | 121.9 | 125.1 | 126.5 | 127.2 | 127.2 |
| 3 | 320 | 30 | 10.6 | 30 | 219.0 | 121.2 | 128.7 | 132.5 | 137.5 | 141.6 |
| 4 | 340 | 30 | 11.1 | 31 | 232.5 | 119.2 | 127.8 | 134.5 | 139.4 | 141.9 |
| 5 | 339 | 15 | 13.5 | 30 | 200.0 | 121.3 | 128.0 | 132.3 | 137.2 | 141.9 |
| 6 | 324 | 10 | 20.8 | 28 | 108.9 | 117.0 | 121.7 | — | 123.3 | 123.7 |
| 7 | 345 | 20 | 11.4 | 28 | 214.5 | 122.0 | 127.7 | 132.5 | 137.8 | 141.7 |

TABLE 2-continued

| | Calcination Conditions | | Product Properties | | | Properties of the 'Activated' Gibbsite | | | | |
|---|---|---|---|---|---|---|---|---|---|---|
| | | | | | | Alumina Dissolved in Spent Liquor (g/l) after the following times at 85° C. * | | | | |
| Expt. No. | End Temp. (°C.) | Time to Temp. (mins) | L.O.I. (%) | Boehmite Content (%) | Specific Surface (m²/g) | 1 | 2 | 3 | 5 | 8 (Hrs.) |
| 8 | 356 | 20 | 10.9 | 30 | 225.0 | 121.6 | 128.2 | 133.8 | 139.3 | 142.0 |
| 9 | 378 | 30 | 8.0 | 28 | 241.2 | 112.1 | 119.6 | 125.2 | 133.9 | 139.1 |
| 10 | 419 | 30 | 6.8 | 26 | 234.7 | 106.4 | 113.9 | 119.5 | 127.5 | 132.6 |
| 11 | 460 | 30 | 5.9 | 19 | 239.0 | 95.27 | 103.6 | 108.2 | 115.1 | 121.6 |
| 12 | 502 | 30 | 3.0 | 2 | 191.9 | 96.99 | 101.3 | 106.4 | 109.7 | 114.6 |

* 140 g/l $Na_2O_{free}$ concentration, charging for 145 g/l alumina concentration Table 2 shows that the boehmite formed during calcination is formed relatively quickly. Furthermore, the amount of boehmite is relatively constant at 28-31% in the temperature range of 300°-400° C. The results also demonstrate the importance of controlling the L.O.I. of the calcined gibbsite.

Figure 1:
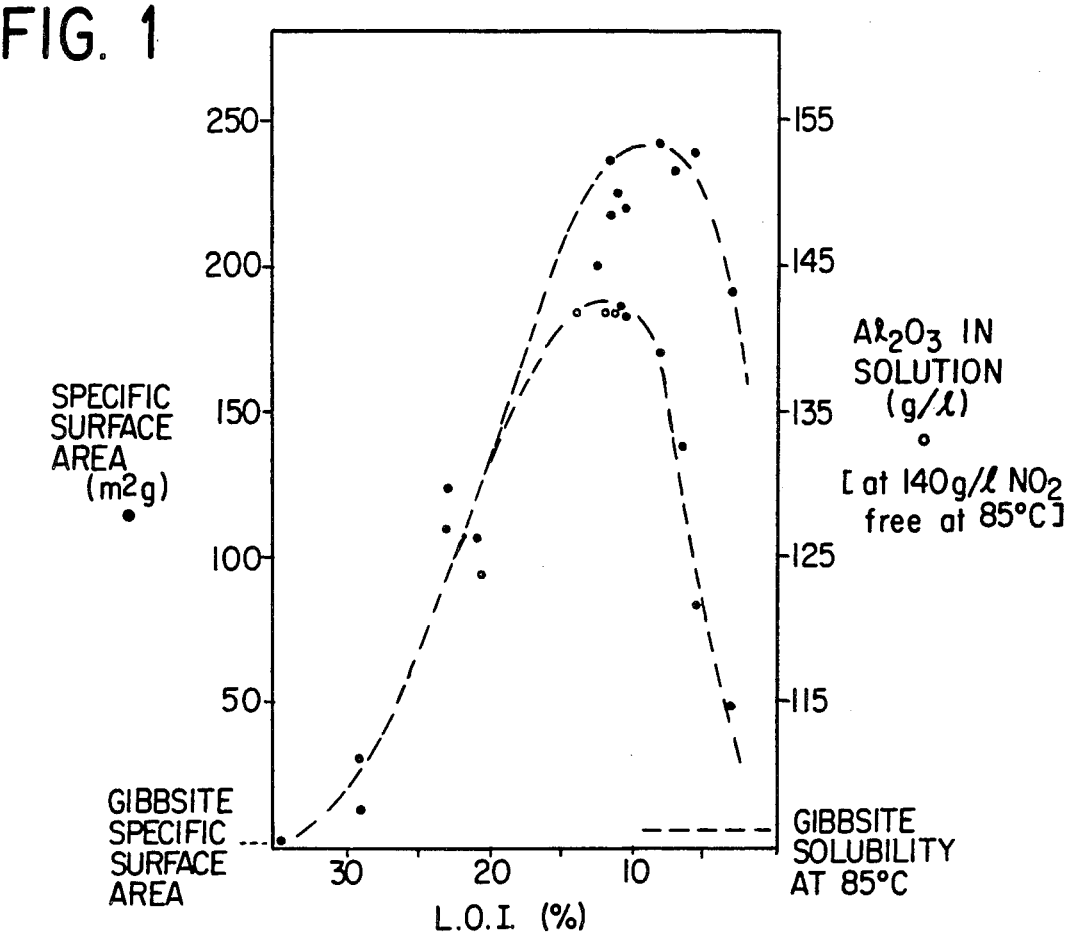
FIG. 1 is a graph depicting the properties of calcined gibbsite.

FIG. 1 graphically demonstrates the relationship between the specific surface area, solubility and L.O.I. of the boehmite-containing, activated, gibbsite. Referring to FIG. 1 it can be observed that the maximum points in solubility and specific area curves do not coincide. The maximum solubility occurs at 10-13% L.O.I., while the maximum surface area is obtained at 6-8% L.O.I. Without wishing to be bound by theory, it is believed that at approximately 400° C., the boehmite initially formed begins to transform to gamma-alumina, which is less soluble in Bayer spent liquor at 85° C. than the activated matrix material that forms directly from the initial gibbsite calcination.

To produce an end-product which is substantially 100% boehmite, the experimental conditions derived from the data in Table 1 were used. A preferred embodiment of the present invention employs the conditions of test no. 8, i.e. an end temperature of 356° C. and a calcination time of 20 minutes. Sufficient material was calcined using the aforementioned preferred conditions for five dissolution experiments to produce boehmite in a caustic aluminate liquor of approximately 140 g/l $Na_2O$ free concentration and target alumina concentration of 140 g/l. The results are presented below in Table 3.

TABLE 3

Properties Of The Boehmite Produced As A Function Of Dissolution Time at 85° C.

| Expt. No. | Dissolution Time (Hrs.) | Percent Boehmite | Specific Surface Area (m²/g) |
|---|---|---|---|
| 1 | 4 | 82 + X-ray amorphous material | 57 |
| 2 | 6 | 90 + X-ray amorphous material | 48 |
| * 3 | 8 | 100 | 38 |
| * 4 | 8 | 100 | 27 |
| * 5 | 8 | 100 | 22 |
| 6 | 10 | 89 + Gibbsite | 13 |

* These results are those given in Table 1 under experiments 1, 2 and 3.

The results shown in Table 3 demonstrate the potential difficulties which must be avoided if substantially 100% boehmite is to be produced. For example, the dissolution period must be long enough to solubilize all of the matrix material but not so long as to risk nucleating gibbsite and causing contamination of the product boehmite. In experiments 3-5 in Table 3, an 8 hour dissolution time led to the production of 100% boehmite with enhanced surface area, whereas heating for 10 hours (experiment 6 in Table 3) reduced the amount of boehmite to 89% and led to reprecipitation of the starting gibbsite. As stated previously, this latter problem can be minimized by the addition of small amounts of $CaCO_3$ prior to the dissolution of 'activated' gibbsite.

The invention has been described above with reference to preferred embodiments. It would be obvious to one of ordinary skill in the art that many additions, substitutions and/or deletions can be made without departing from the scope of the invention as claimed below.

What is claimed is:

1. A process for producing boehmite crystals comprising:
   calcinating gibbsite particles at a temperature above 300 degrees C to lower L.O.I. to less than 20% to produce boehmite particles embedded in a matrix material, the matrix material being essentially chi-alumina and essentially free of gibbsite, gamma-alumina and alpha-alumina;
   dissolving the matrix material in a caustic aluminate liquor, at atmospheric pressure and at a temperature of from about 60°-120 degrees C to liberate the boehmite particles; and,
   recovering boehmite particles essentially free of gibbsite, gamma-alumina and alpha-alumina and having an average particle size of between 1 and 2 micrometers and a specific surface area of 13 to 57 m²/gram.

2. The process of claim 1 which comprises dissolving said matrix material in spent caustic aluminate liquor from the Bayer Process.

3. The process of claim 1 which comprises dissolving said matrix material under conditions of atmospheric pressure and temperature and for a sufficient time period to produce a product which is 100% boehmite.

4. The process of claim 2 wherein said boehmite particles have a specific surface area of 20-40 m² per gram.

5. The process of claim 4 wherein said spent liquor is obtained from the Bayer Process and a high alumina containing pregnant liquor is returned to the hydrate precipitation circuit of the Bayer Process after said recovery step.

6. The process of claim 1 wherein said dissolving step is carried out in a pure caustic aluminate liquor or in a liquor obtained from the Bayer Process and free from colored organic material.

7. The process of claim 1 which comprises adding a stabilizer material to said liquor in said dissolution step to hinder nucleation of gibbsite.

8. The process of claim 7 wherein said stabilizer comprises calcium ions.

9. The process of claim 8 which comprises adding between about 30 and about 50 milligrams of calcium ions per liter of solution to said dissolution liquor.

10. The process of claim 1 wherein said caustic aluminate liquor comprises spent liquor from the Bayer Process, synthetic caustic aluminate liquor or mixtures thereof.

* * * * *